(12) United States Patent
Baruch et al.

(10) Patent No.: US 10,409,495 B1
(45) Date of Patent: Sep. 10, 2019

(54) DATA OPTIMIZATION DECISION CONTROL BASED ON FILE SYSTEM METADATA

(71) Applicant: EMC IP Holding Company LLC, Hopkinton, MA (US)

(72) Inventors: Leehod Baruch, Rishon Leziyon (IL); Assaf Natanzon, Tel Aviv (IL); Saar Cohen, Moshav Mishmeret (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 15/394,174

(22) Filed: Dec. 29, 2016

(51) Int. Cl.
  *G06F 3/06* (2006.01)
  *G06F 11/14* (2006.01)
  *G06F 16/17* (2019.01)

(52) U.S. Cl.
  CPC ............ *G06F 3/0608* (2013.01); *G06F 3/065* (2013.01); *G06F 3/067* (2013.01); *G06F 3/0641* (2013.01); *G06F 11/1453* (2013.01); *G06F 11/1464* (2013.01); *G06F 16/17* (2019.01); *G06F 2201/805* (2013.01)

(58) Field of Classification Search
  CPC ........ G06F 3/06; G06F 3/0608; G06F 3/0641; G06F 3/065; G06F 3/067; G06F 11/1453; G06F 11/1464; G06F 16/17
  USPC .......................................................... 711/162
  See application file for complete search history.

(56) References Cited

U.S. PATENT DOCUMENTS

| | | | |
|---|---|---|---|
| 9,201,890 B2 * | 12/2015 | Jayaraman | G06F 3/0647 |
| 9,678,981 B1 * | 6/2017 | Taylor | G06F 17/30194 |
| 9,710,317 B2 * | 7/2017 | Gupta | G06F 11/076 |
| 2002/0133491 A1 * | 9/2002 | Sim | G06F 17/30067 |
| 2004/0255048 A1 * | 12/2004 | Lev Ran | G06F 9/546 |
| | | | 709/249 |
| 2006/0173956 A1 * | 8/2006 | Ulrich | G06F 17/30067 |
| | | | 709/203 |
| 2015/0193338 A1 * | 7/2015 | Sundaram | G06F 3/0688 |
| | | | 711/103 |
| 2016/0246815 A1 * | 8/2016 | Vibhor | H04L 29/0854 |
| 2016/0274976 A1 * | 9/2016 | Manjunath | G06Q 10/00 |
| 2016/0344834 A1 * | 11/2016 | Das | H04L 67/2842 |
| 2018/0025021 A1 * | 1/2018 | Jain | G06F 17/30174 |
| | | | 707/626 |

* cited by examiner

*Primary Examiner* — Pierre Miche Bataille
(74) *Attorney, Agent, or Firm* — Ryan, Mason & Lewis, LLP (57) ABSTRACT

Metadata from a file system in a data storage environment is obtained. The obtained metadata from the file system is indicative of one or more properties of one or more data blocks storable in the data storage environment. One or more data optimizations performed in a data protection operation for the data storage environment with respect to the one or more data blocks are controlled based on at least a portion of the metadata obtained from the file system.

20 Claims, 7 Drawing Sheets

DATA OPTIMIZATION DECISION CONTROL BASED ON FILE SYSTEM METADATA

FIELD

The field relates generally to data storage environments such as, for example, replication systems and backup systems, and more particularly to techniques for making improved data optimization decisions in such data storage environments.

BACKGROUND

Replication systems typically protect a primary data storage system (often called a production system or production site) by replicating the primary data storage system on a secondary data storage system (often called a replica system or replica site). The production site and the replica site are typically coupled by a communications network such as a wide area network (WAN). Further, replication systems use data optimizations such as data compression and data deduplication algorithms to save WAN bandwidth as well as storage space.

These optimizations, however, require resources of the data storage environment such as central processing unit (CPU) resources and random access memory (RAM) resources. If the data is compressible and there are repeating data blocks, then these optimizations are very cost-effective. However, if the data is not compressible or dedupeable, these optimizations waste CPU and RAM and do not contribute to WAN overhead reduction.

SUMMARY

Embodiments of the disclosure provide techniques for making improved data optimization decisions in data storage environments.

For example, in one embodiment, a method comprises the following steps. Metadata from a file system in a data storage environment is obtained. The obtained metadata from the file system is indicative of one or more properties of one or more data blocks storable in the data storage environment. One or more data optimizations performed in a data protection operation for the data storage environment with respect to the one or more data blocks are controlled based on at least a portion of the metadata obtained from the file system.

These and other illustrative embodiments include, without limitation, methods, apparatus, systems, and computer program products comprising processor-readable storage media.

DETAILED DESCRIPTION

Illustrative embodiments of the disclosure will be described herein with reference to exemplary data storage environments and associated production and replica sites, data backup systems, processing platforms and processing devices. It is to be appreciated, however, that embodiments are not restricted to use with the particular illustrative system and device configurations shown. Moreover, the term "data storage environment" as used herein is intended to be broadly construed, so as to encompass, for example, multi-site data centers, private or public cloud computing systems, grid computing systems, computing clusters, high performance computer systems or storage systems, as well as other types of systems comprising distributed information technology infrastructure.

Advantageously, as will be explained herein, illustrative embodiments use file system metadata such as, by way of example only, file type, to control the data optimizations applied to data blocks. In certain embodiments "metadata" as illustratively used herein may refer to data that describes, identifies, characterizes, or is otherwise about other data. In many embodiments, the use of file type, as file system metadata, to control data optimization decisions may be based on a realization that application of data optimizations on data blocks of certain file types are more likely to benefit the data storage environment as opposed to application of data optimizations on data blocks of certain other file types. Thus, in accordance with illustrative embodiments, a replication system or a backup system may estimate the probability that a particular data optimization will be effective for data blocks of a given file type. Additionally or alternatively, other kinds of file system metadata may be used to control the data optimizations.

In some embodiments herein, "data optimization" as the term is illustratively used herein may refer to an operation associated with data that attempts to improve some aspect of a system, network, or environment within which the data resides or otherwise exists. Non-limiting examples of such data optimizations described herein include data compression, data deduplication, and data placement.

In certain embodiments, data compression may be a data optimization that reduces the size of an incoming data block by encoding the incoming data block into a coded representation that is smaller in size than the incoming data block. In some embodiments, data deduplication may be a data optimization that searches for redundancy of data blocks by comparing an incoming data block to stored data blocks. In most embodiments, if the same data block as the incoming data block is already stored, a reference for the incoming data block (e.g., a pointer to the previously stored identical data block) may be stored rather than the incoming data block itself. Thus, in certain embodiments, by applying data compression and/or data deduplication optimizations, data transmitted from the production site to the replica site may be reduced, thus saving WAN bandwidth, as well as storage space at the replica site. Data placement as an optimization in some embodiments may be further explained below in the context of a data backup system.

Figure 1:
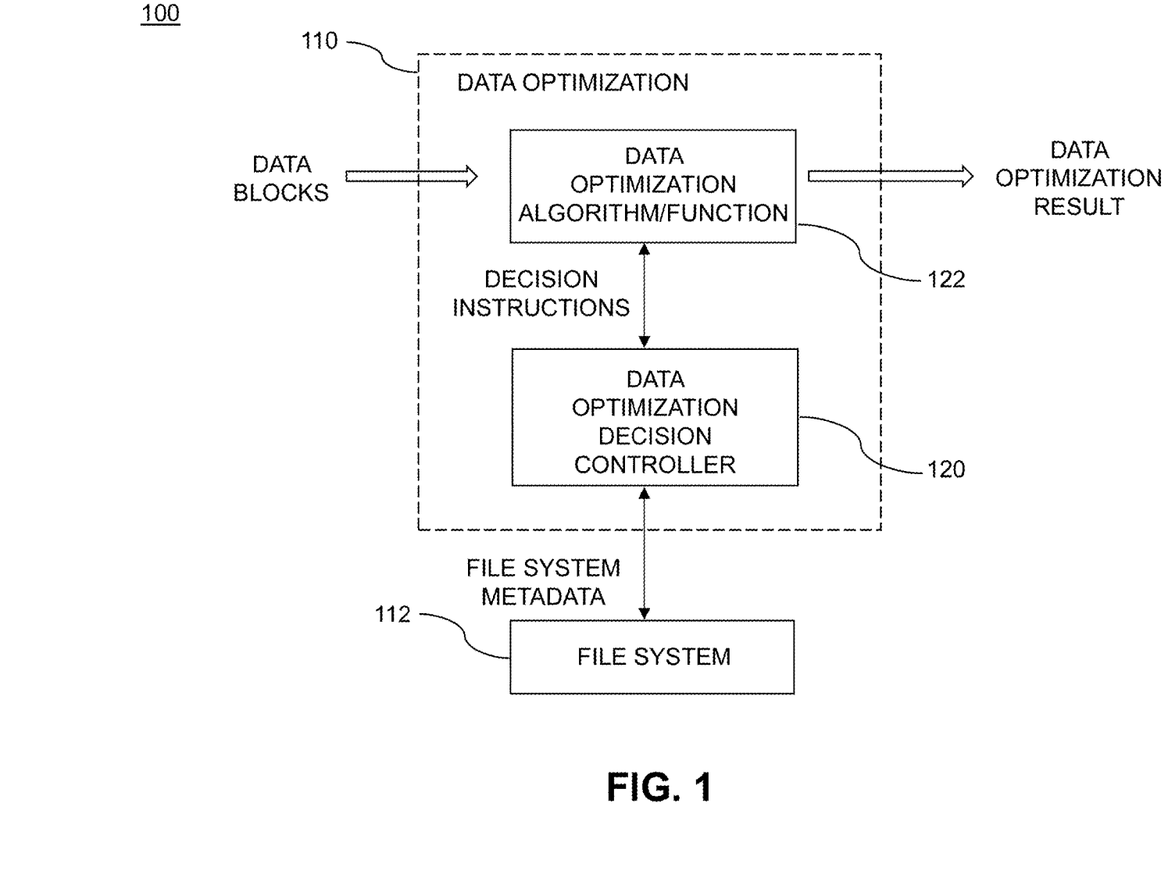
FIG. 1 illustrates data optimization decision control based on file system metadata, according to an embodiment of the disclosure.

The example embodiment of FIG. 1 illustrates a data storage environment 100 with data optimization decision control based on file system metadata, according to an embodiment of the disclosure. As mentioned above, illustrative embodiments use file system metadata such as, by way of example only, file type, to control the data optimizations applied to data blocks. More particularly, as shown in FIG. 1, data blocks are provided to a data optimization module 110 that is part of the data storage environment 100. The data optimization module 110 is operatively coupled to a file system 112. File system 112 provides file system metadata to a data optimization decision controller 120 which in turn generates one or more decision instructions, based on at least a portion of the file system metadata, that are provided to a data optimization algorithm and/or function 122. The decision controller 120 and the data optimization algorithms/functions 122 are part of the data optimization module 110. Examples of the data optimizations/functions will be further described herein, but non-limiting examples include data compression, data deduplication, and data backup placement.

Referring back to the example embodiment of FIG. 1, based on the decision instructions generated by the decision controller 120, the data optimization algorithms/functions 122 generate an output result. As illustratively explained in other embodiments below, when the data optimization algorithms are data compression and/or data deduplication in a replication system, the output result is data-optimized data blocks that may be transferred to a replica site over a WAN (e.g., FIG. 2B). In some embodiments, when the optimization is a data backup placement function in a data backup system, the output result is a routing (or assignment) of the data blocks to a selected one of two or more types of backup servers (e.g., one server type that is configured for dedupeable data and one server type that is configured for non-dedupeable data) in the data backup system (e.g., FIG. 2C).

In certain embodiments, a "file system" may be a system that an operating system employs to store and access data within a data storage environment. In many embodiments, a file system may comprise different methods and data structures designed to read data from and write data to (i.e., store in, retrieve from, or otherwise access) one or more storage devices in the data storage environment.

Furthermore, while "data blocks" are illustrated in the embodiments of the figures and described herein as the data format upon which various data optimizations are applied, it is to be understood that data in some embodiments, formats similar to blocks, e.g., sectors, clusters, etc., may be optimized using data optimization decision control techniques described herein. Furthermore, while the storage devices illustratively described herein as being part of the various data storage environments include block devices in the embodiments herein, in other embodiments, storage devices that support formats similar to block storage may be used. In certain embodiments, a "block device" may be a storage device that supports reading and writing data in fixed-size blocks. In some embodiments, one or more such data blocks are stored in storage volumes on the block devices. In many embodiments, one or more data blocks may be combined together to form a file.

As mentioned above, in many embodiments the use of file system metadata to control data optimization decisions is based on a realization that application of data optimizations on data blocks of certain file types may be more likely to benefit the data storage environment as opposed to application of data optimizations on data blocks of certain other file types. For example, in certain embodiments, it is realized herein that various file types in file systems tend to have typical properties. For example, in some embodiments, files with a filename extension such as ".txt" are typically text files that could be compressed easily. However, in other embodiments, files with ".jpeg", ".avi", and/or ".mp3" filename extensions may be files that are already in a compressed format and their potential to be compressed further is very low. Furthermore, in certain embodiments, some files are present on each machine (e.g., processing device or node) in the data storage environment that runs the same operating system, such as executable files (".exe" files), library files (".lib" files) and shared object files (".obj" files). In some embodiments, files are therefore very good candidates for deduplication across machines.

Thus, in accordance with illustrative embodiments, a data storage environment is able to estimate the probability that a particular data optimization will be effective for data blocks of a given file type based on knowledge of the file type. As such, data optimization decision control according to illustrative embodiments may minimize wasting of CPU and RAM resources by preventing data optimizations from occurring on data blocks that will not likely benefit from the data optimizations (e.g., compression on data blocks associated with ".jpeg", ".avi", and/or ".mp3" type files), and applying data optimizations on data blocks that may likely benefit from the data optimizations (e.g., deduplication on data blocks associated with ".exe", ".lib", and/or ".obj" type files).

In some embodiments, it is to be understood that file system metadata other than file type may be additionally or alternatively used to generate data optimization decision instructions. For example, in certain embodiments, a file size, a file name, a file date, and/or a file location of a file with which the one or more data blocks are associated may be used. More particularly, in certain embodiments the data optimization module 110 of the embodiment of FIG. 1 may be configured to make data compression/deduplication decisions based on the size, name, date, and/or location of the file with which the data blocks being processed are associated.

Figure 2A:
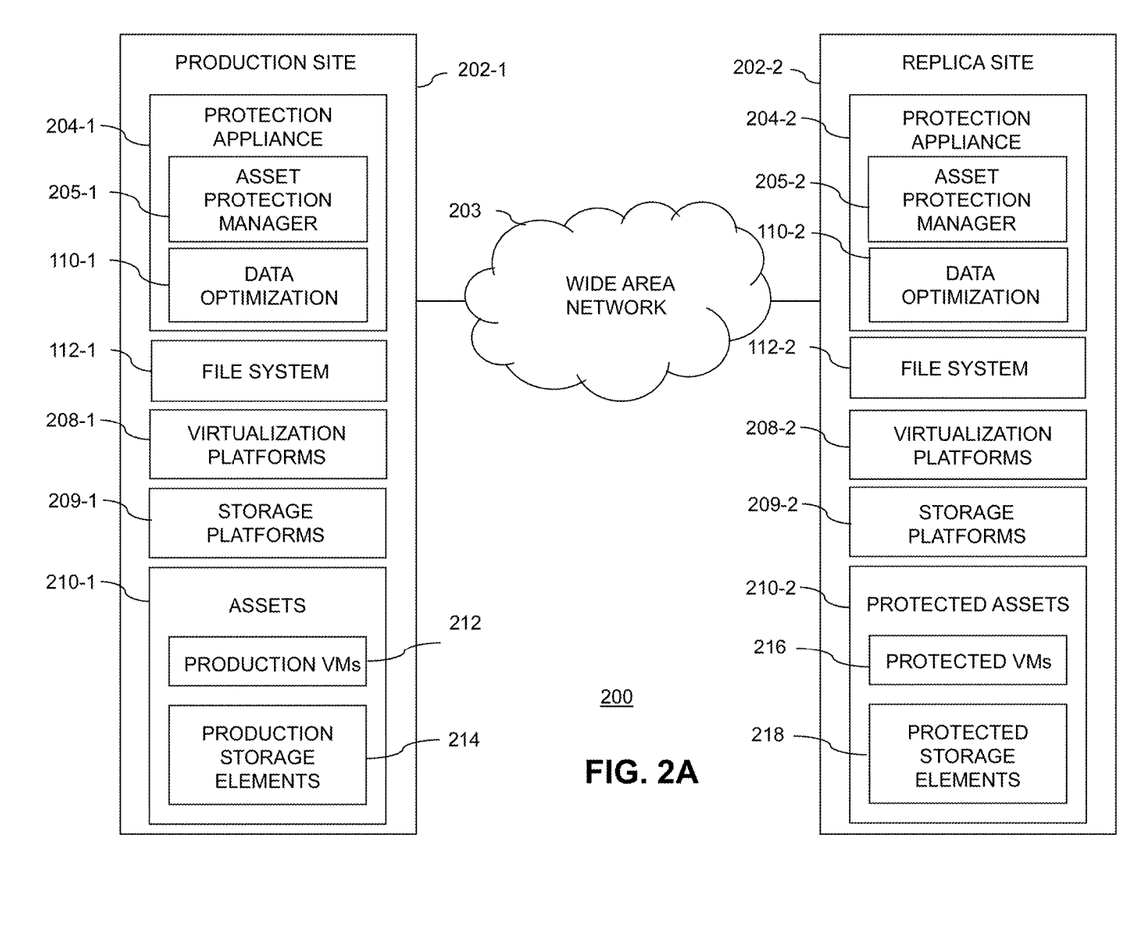
FIG. 2A illustrates a data storage environment with data optimization decision control based on file system metadata, according to an embodiment of the disclosure.
Figure 2B:
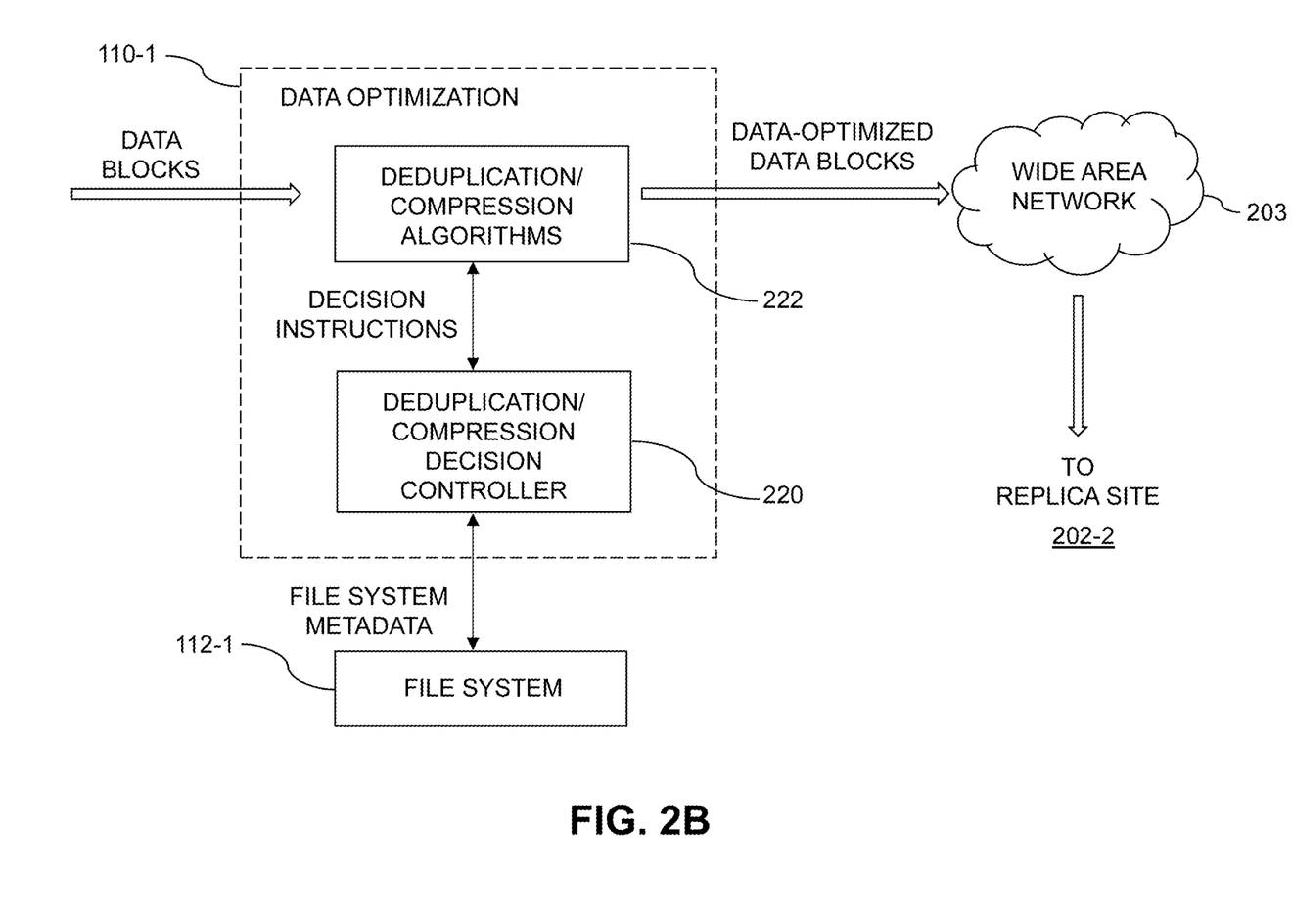
FIG. 2B illustrates data optimization decision control based on file system metadata for use in wide area network improvement, according to an embodiment of the disclosure.
Figure 2C:
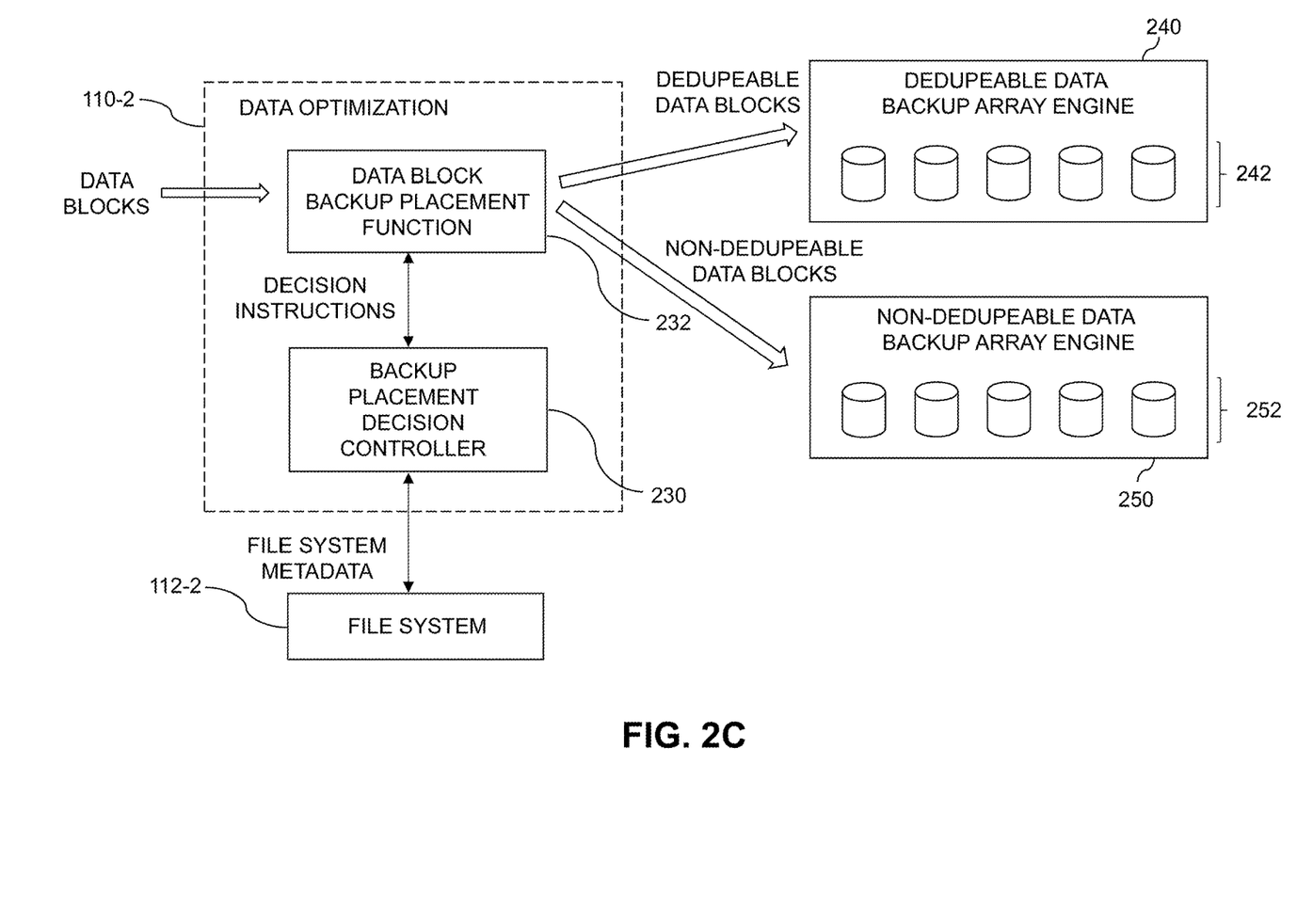
FIG. 2C illustrates data optimization decision control based on file system metadata for use in data backup improvement, according to an embodiment of the disclosure.

Referring back to the embodiment of FIG. 1, the location of the data optimization module 110 within the data storage environment 100 depends on the nature and configuration of the data storage environment. For example, the data storage environment 100 may comprise a replication system, a data backup system, or some combination of both. In such cases, data optimization module 110 is implemented in a location within the replication system or data backup system where it is functionally needed or where it is most functionally efficient. By way of example, in the example embodiment of FIG. 2B illustrates data optimization module 110 implemented in a production site of a replication system (FIG. 2A), while FIG. 2C illustrates data optimization module 110 implemented in a backup function of a replica site of a replication system (FIG. 2A). That is, referring as well to the example embodiment of FIG. 1, data optimization module 110 may be implemented in more than one location within a data storage environment. For example, the data storage environment 100 can perform data optimizations based on the file system metadata to transfer the data to a remote site, and then perform further data optimizations based on the file system metadata to write the data into a particular type of backup server. Of course, data optimization module 110 can be implemented in one location in the data storage environment. It is to be understood that the data optimization module 110 can be implemented in alternative data storage system architectures other than those shown in FIGS. 2A, 2B and 2C.

Turning now to the example embodiment of FIG. 2A, a data storage environment 200 is illustrated comprising a replication system with data optimization decision control based on file system metadata, according to an embodiment of the disclosure. In this illustrative embodiment, the data optimization module 110 and the file system 112 of FIG. 1 can be considered as being implemented within data storage environment 200 as: data optimization module 110-1 and file system 112-1, respectively; data optimization module 110-2 and file system 112-2, respectively; or both sets of modules.

Data storage environment 200 depicts a block device replication system. In accordance with illustrative embodiments, such a replication system may be configured to understand the file system that is being replicated within the protected block device and use the metadata of the files, such as name, suffix, size, dates, etc. (i.e., file system metadata) as hints for controlling data compression and data deduplication algorithms. Advantageously in some embodiments, these hints can help these algorithms by estimating the potential of applying the optimizations on the files' blocks and by that save CPU and RAM resources and make the replication more efficient.

For example, in accordance with illustrative embodiments, a data compression algorithm may skip blocks of files that have a known compressed format. Further, in some embodiments, the replication system may apply a compression algorithm which is known to achieve better compression for the given file type (e.g., ".jpeg", ".avi", ".mp3"). Still further in some embodiments, if the replication protects a large number of virtual machines with the same operating system, blocks of binary files of the operating system (e.g., ".exe", ".lib", ".obj") may be expected to contribute to the deduplication effort, and therefore should have a high probability to be added to the deduplication cache. Example embodiments of these features and advantages will be further described below in the context of FIGS. 2B and 2C.

Referring back to the example embodiment of FIG. 2A, the data storage environment 200 in FIG. 2A comprises a production site 202-1 that communicates with a replica site 202-2 over a network 203. The production and replica sites 202 are examples of what are more generally referred to herein as respective first and second sites of a data storage environment. Numerous other types and arrangements of multiple sites may be used in other embodiments, and such sites may be configured to implement similar functionality. For example, although site 202-1 is shown as a production site relative to replica site 202-2 in this embodiment, site 202-1 may additionally serve as a replica site relative to site 202-2 operating as a production site. In addition, a given one of the sites 202-1 or 202-2 may be configured to serve as a replica site for each of multiple production sites of a data storage environment.

In some embodiments, replica site 202-2 may be implemented utilizing a Data Domain® system from Dell EMC of Hopkinton, Mass. In certain embodiments, a Data Domain® system may provide secondary storage optimized as a replica or backup target for data blocks of a primary storage system (e.g., production site 202-1), and is therefore may be suited for use as part of replica site 202-2.

Referring back to the example embodiment of FIG. 2A, the network 203 may comprise, for example, a global computer network such as the Internet, a wide area network (WAN), a local area network (LAN), a software defined network (SDN), a satellite network, a telephone or cable network, a cellular network, a wireless network such as WiFi or WiMAX, a network comprising virtual network switches, or various portions or combinations of these and other types of networks.

It is assumed in this exemplary discussion that site 202-2 replicates functions, processes, structures, modules and assets of site 202-1 for purposes of protecting site 202-1 from loss, corruption, and/or failure by providing redundancy. Thus, as is shown, site 202-2 comprises the same or similar functions, processes, structures, modules and assets as site 202-1, as will be further explained below. Since, in illustrative embodiments, data is processed as data blocks, the production site may include block devices and the replica site 202-2 may be referred to as a block device protection system.

Referring back to the example embodiment of FIG. 2A, the sites 202-1 and 202-2 comprise respective protection appliances 204-1 and 204-2 implementing respective asset protection managers 205-1 and 205-2. It is understood that the asset protection manager 205-1 operates in conjunction with asset protection manager 205-2 to replicate functions, processes, structures, modules and assets of site 202-1 on site 202-2. The asset protection managers 205-1 and 205-2, although shown as elements of the protection appliances 204-1 and 204-1 in the present embodiment, may in other embodiments be implemented at least in part using an external controller, that is, a controller that is external to one or both of the sites 202-1 and 202-2.

Also shown as part of the protection appliances 204-1 and 204-2 are data optimization modules 110-1 and 110-2. Such data optimization modules can alternatively be implemented separate from the protection appliances. As mentioned above, in this example, data optimization module 110-1 and data optimization module 110-2 are considered respective implementations of data optimization module 110 shown in FIG. 1. Data optimization modules 110-1 and 110-2 comprise one or more data optimization algorithms that are applied to assets, such as data blocks, of the data storage environment 200. Examples of data optimizations include, but are not limited to, data block compression, data block deduplication, and data backup placement. Certain data optimizations can be applied on either the production site (block 110-1), the replica site (block 110-2), or both. In the case of illustrative embodiments described herein, the data optimizations are preferably applied on the production site 202-1 so as to improve WAN bandwidth, and on the replica site 202-2 so as to improve data backup placement. By way of example only, in certain embodiments if data is not compressed and/or deduplicated prior to being received by the replica site, one or more such data optimizations may be applied at the replica site. Also, in some embodiments data optimization decision control as described herein may be implemented in standalone or local data storage systems. Alternative data optimizations may be employed in accordance with data storage environment 200.

As will be explained in further detail herein, illustrative embodiments provide decision control with respect to the data optimizations based on file system metadata provided by file system 112-1 and/or file system 112-2. File systems 112-1 and 112-2 are considered implementations of file system 112 shown in FIG. 1.

Further details of the data optimization module 110-1 and file system 112-1 will be described below in the context of the example embodiment of FIG. 2B, while further details of data optimization module 110-2 and file system 112-2 will be described below in the context of FIG. 2C.

Referring back to the example embodiment of FIG. 2A, the sites 202-1 and 202-2 further comprise respective virtualization platforms 208-1 and 208-2, each of which may comprise one or more hypervisors. An example of a commercially available virtualization platform that may be used in one or more embodiments of the disclosure is the VMware® vSphere™ which may have an associated virtual infrastructure management system such as the VMware® vCenter™. Other types of virtualization platforms that may be used include Microsoft Hyper-V Server.

Referring back to the example embodiment of FIG. 2A, the sites 202-1 and 202-2 also comprise respective storage platforms 209-1 and 209-2. In certain embodiments, these storage platforms may be implemented, for example, using storage products such as VNX and Symmetrix VMAX, both commercially available from Dell EMC Corporation of Hopkinton, Mass. In other embodiments, a variety of other products may be utilized to implement at least a portion of the storage platforms 209-1 and 209-2. For example, in other embodiments, storage platform functionality may be incorporated within a virtualization platform product.

In certain embodiments, the protection appliances 204-1 and 204-2 of the example embodiment of FIG. 2A, may be implemented at least in part using respective hypervisors of the virtualization platforms 208-1 and 208-2, respectively, and/or the storage platforms 209-1 and 209-2, respectively, of the production and replica sites.

Referring back to the example embodiment of FIG. 2A, associated with the production site 202-1 are complex assets 210-1 that illustratively include production virtual machines (VMs) 212 and production storage elements 214. The replica site 202-2 comprises corresponding complex assets 210-2 that include protected virtual machines 216 corresponding to respective ones of the production virtual machines 212 and protected storage elements 218 corresponding to respective ones of the production storage elements 214. These virtual machines 216 and storage elements 218 may typically be referred to as respective "ghost" elements prior to bringing at least a portion of them into a fully operational status in conjunction with recovery of a failure in one of the corresponding complex assets 210-1 of the production site 202-1. Storage elements may be in the form of storage volumes stored on block devices.

Further, the protection appliances 204-1 and 204-2, and their associated asset protection managers 205-1 and 205-2, are utilized in configuring the virtual machines 216 and storage elements 218 of the replica site in a manner that facilitates recovery from a failure in one of the complex assets 210-1 of the production site. The protection appliances 204-1 and 204-2 may each run on a computer, server or other processing platform element, which may be viewed as an example of what is more generally referred to herein as a "processing device."

The example embodiment of FIG. 2B illustrates details of data optimization module 110-1 and file system 112-1 at production site 202-1 (FIG. 2A). As shown, data blocks are provided to the data optimization module 110-1. The data optimization module 110-1 is operatively coupled to a file system 112-1. File system 112-1 provides file system metadata to a data optimization decision controller 220 which in turn generates one or more decision instructions, based on at least a portion of the file system metadata, that are provided to a deduplication/compression algorithms 222. The decision controller 220 and the deduplication/compression algorithms 222 are part of the data optimization module 110-1. The deduplication/compression decision controller 220 and the deduplication/compression algorithms 222 are example implementations of the data optimization decision controller 120 and the data optimization algorithm/function 122, respectively, of the data optimization module 110 in FIG. 1.

Based on the decision instructions generated by the decision controller 220, deduplication/compression algorithms are applied or not applied to the data blocks. For example, as per the illustrative file types mentioned above, compression may be applied to data blocks of a text file but not to data blocks of an already compressed video format (mp3) file. Likewise, decision instructions may indicate that deduplication be applied to data blocks of executable files or library files. Still further, the decision instructions can instruct which compression algorithm to apply to achieve better compression for the file type. The output from the algorithms 222 is data-optimized data blocks (either data compressed, deduped, or both) that are transferred for storage (e.g., as protected assets) to the replica site 202-2 over a WAN 203.

In another illustrative embodiment, data optimization decision control techniques are applied to data backup systems. This implementation is illustrated in the example embodiments of FIG. 2C. FIG. 2C illustrates details of data optimization module 110-2 and file system 112-2 at replica site 202-2 (FIG. 2A). However, the data optimization module in FIG. 2C could provide data optimization decision control in a data backup system separate from replication system 200.

More particularly in a particular embodiment, assume a data backup system has a mechanism that splits the backup into two engines—one engine is used for regular, dedupeable data, and the other engine uses larger, more inexpensive disks that is used for non-dedupeable data. In accordance with this embodiment, file system metadata (e.g., file type) is used to instruct the data backup system on which engine to place each data block based on the file type of the data block. For example, in this embodiment, data blocks associated with executable files, library files, and object files would be sent to the dedupeable data backup array engine, and data blocks not likely to benefit from deduplication would be sent to the non-dedupeable backup array engine.

More particularly, as shown in the data storage environment in the example embodiment of FIG. 2C, data blocks are provided to the data optimization module 110-2. The data optimization module 110-2 is operatively coupled to a file system 112-2. File system 112-2 provides file system metadata to a backup placement decision controller 230 which in turn generates one or more decision instructions, based on at least a portion of the file system metadata, that are provided to a data block backup placement function 232. The decision controller 230 and the placement function 232 are part of the data optimization module 110-2. The backup placement decision controller 230 and the data block backup placement function 232 are example implementations of the data optimization decision controller 120 and the data optimization algorithm/function 122, respectively, of the data optimization module 110 in FIG. 1.

Based on the decision instructions generated by the decision controller 230, data blocks are routed to either dedupeable data backup array engine 240 for storage on backup storage devices 242 or non-dedupeable data backup array engine 250 for storage on backup storage devices 252. For example, as per the illustrative file types mentioned above, if a data block is identified as being associated with an executable file (determined by metadata provided by file system 112-2 to decision controller 230), then that data block is placed at backup array engine 240 since it is likely to benefit from deduplication. Backup array engine 240 can apply data deduplication if the data has not already been deduplicated. Data blocks of file types identified by file system metadata that would not likely benefit from deduplication are routed by placement function 232 to backup array engine 250. Thus, in this embodiment, the data optimization function is considered the data block placement or assignment.

In the scenario where the data blocks are already deduplicated (at the production site 202-1) before being received at the data optimization module 110-2, deduplicated data may be routed to the smaller storage capacity devices of backup array engine 240, while non-deduplicated data may be routed to the larger storage capacity devices of backup array engine 250. The routing decision is performed by decision controller 230 based on knowledge of the file type of the data blocks as provided by file system metadata.

Therefore, advantageously, data optimization according to illustrative embodiments may be implemented in a single location or more than one location within a data storage environment. For example, in a multiple location scenario, a data storage environment can perform data optimizations based on the file system metadata to transfer the data to a remote site (as shown in FIG. 2B), and then perform further data optimization based on the file system metadata to write the data into a particular type of backup server (as shown in FIG. 2C).

Figure 3A:
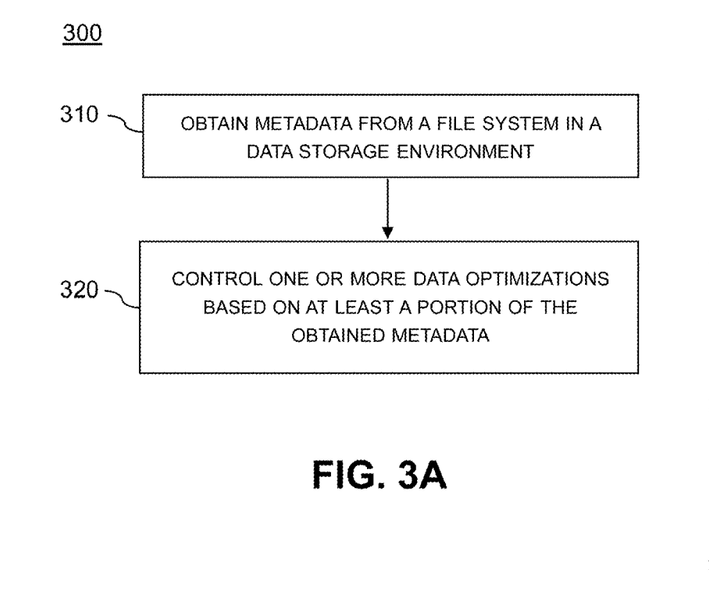
FIG. 3A illustrates a methodology for data optimization decision control based on file system metadata, according to an embodiment of the disclosure.

Turning now to the example embodiment of FIG. 3A, a methodology 300 is illustrated for data optimization decision control based on file system metadata, according to an embodiment of the disclosure. The flow diagram in FIG. 3A summarizes main steps of the methodology. More particularly, as shown, step 310 obtains metadata from a file system in a data storage environment. The obtained metadata from the file system is indicative of one or more properties of one or more data blocks storable in the data storage environment. Then, step 320 controls one or more data optimizations performed in a data protection operation for the data storage environment with respect to the one or more data blocks. Controlling of the one or more data optimizations is based on at least a portion of the metadata obtained from the file system.

Figure 3B:
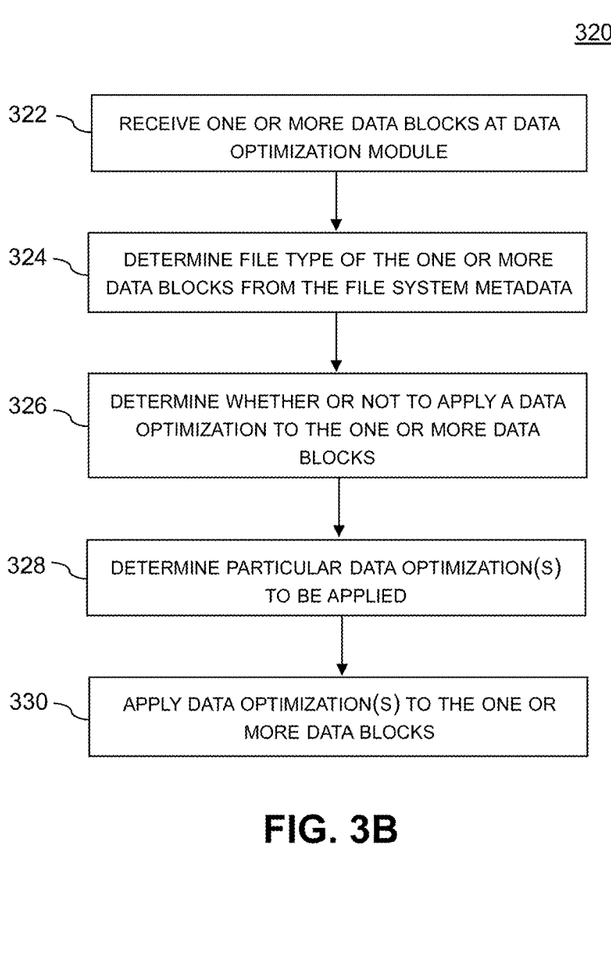
FIG. 3B illustrates further illustrative details of the controlling step of the methodology of FIG. 3A.

The example embodiment of FIG. 3B illustrates further illustrative details of controlling step 320. More particularly, step 322 receives one or more data blocks at a data optimization module. Step 324 determines the file type of the one or more data blocks from the file system metadata. Step 326 determines whether or not to apply a data optimization (e.g., data compression, data deduplication, data placement) to the one or more data blocks based on the determined file type. When it is determined that data compression or data deduplication should be applied, step 328 determines a particular data compression algorithm or data deduplication algorithm to be applied. Then, step 330 applies the one or more data optimizations to the one or more data blocks.

In one example, the data storage environment may comprise a replication system with a production site and a replica site operatively coupled by a communications network. In such an example, one or more data optimizations (e.g., data compression, data deduplication) are controlled based on at least a portion of the metadata obtained from the file system.

In another example, the data storage environment may comprise a backup system wherein controlling the one or more data optimizations comprises deciding on placement of the one or more data blocks between a dedupeable data backup array engine and a non-dedupeable data backup array engine of the backup system.

As mentioned previously, at least portions of the data storage environments shown in FIGS. 1-2C may be implemented using one or more processing platforms. Illustrative embodiments of such platforms will now be described in greater detail in conjunction with FIGS. 4 and 5.

Figure 4:
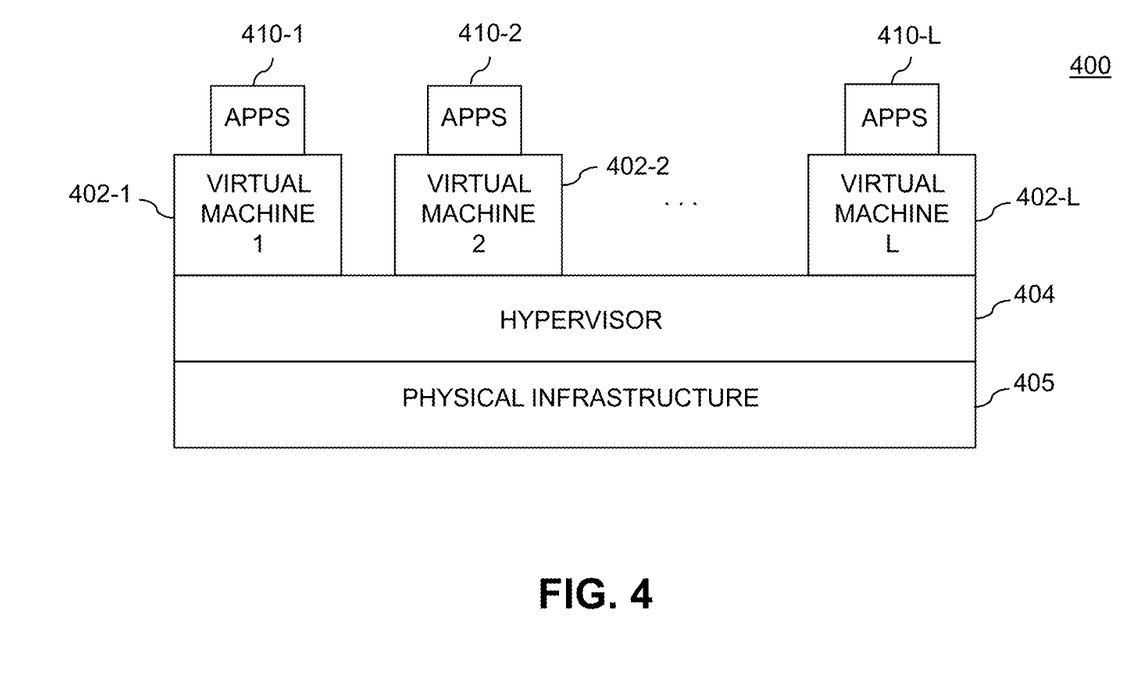
FIGS. 4 and 5 show examples of processing platforms that may be utilized to implement at least a portion of a data storage environment in illustrative embodiments of the disclosure.

The example embodiment of FIG. 4 shows an example processing platform comprising cloud infrastructure 400. The cloud infrastructure 400 comprises a combination of physical and virtual processing resources that may be utilized to implement at least a portion of the data storage environments. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

These and other types of cloud infrastructure can be used to implement one or more system components, such as data optimization module 110, file system 112, and other components shown in FIGS. 1-2C, and combinations or portions thereof, in a given embodiment.

Although only a single hypervisor 404 is shown in the embodiment of FIG. 4, the data storage environment may of course include multiple hypervisors each providing a set of virtual machines using at least one underlying physical machine. Different sets of virtual machines provided by one or more hypervisors may be utilized in configuring multiple instances of various components of the data storage environment.

An example of a commercially available hypervisor platform that may be used to implement hypervisor 404 and possibly other portions of the data storage environments in one or more embodiments of the disclosure is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

In some embodiments, particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC of Hopkinton, Mass. In other embodiments, combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the data storage environment.

As is apparent from the above, one or more of the processing modules or other components of the data storage environments shown in FIGS. 1-2C may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

Figure 5:
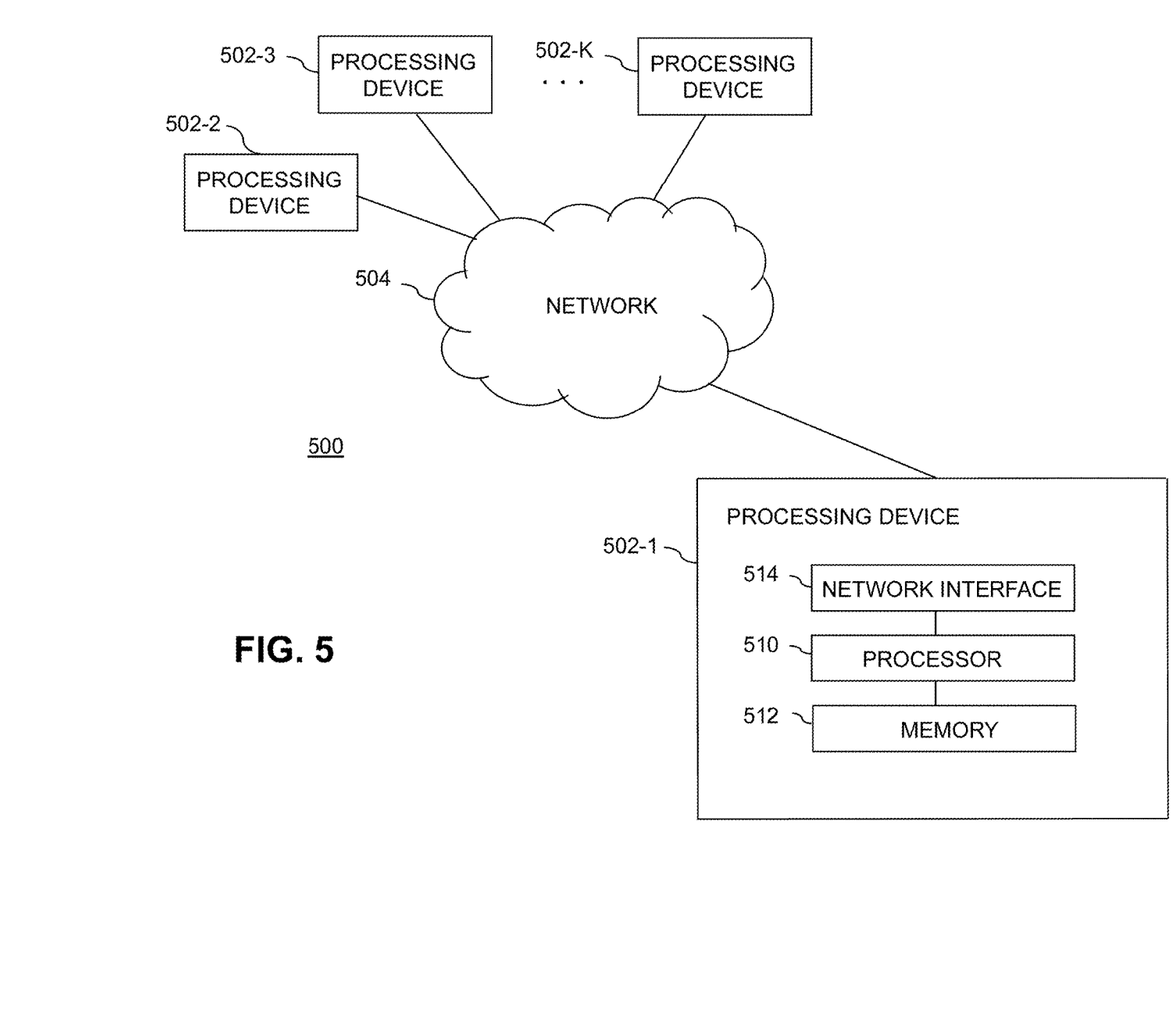

The processing platform 500 in this embodiment comprises a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs). In certain embodiments, each device may be a physical or virtual device or any combination thereof. In some embodiments, logic may be executed across one or more virtual or physical processors. A virtual processor may be implemented one or more portions of a physical processor.

The containers may be associated with respective tenants of a multi-tenant environment of the data storage environments, although in other embodiments a given tenant can have multiple containers. The containers may be utilized to implement a variety of different types of functionality within the data storage environments. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the data storage environments. Such components can communicate with other elements of the data storage environments over any type of network or other communication media.

As indicated previously, components of a data storage environment as disclosed herein can be implemented at least in part in the form of one or more software programs stored in memory and executed by a processor of a processing device. For example, at least portions of a data optimization module and file system or other data storage environment components are illustratively implemented in one or more embodiments the form of software running on a processing platform comprising one or more processing devices.

As mentioned previously, at least portions of the data storage environments in FIGS. 1-2C may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

It should again be emphasized that the above-described embodiments of the disclosure are presented for purposes of illustration only. Many variations and other alternative embodiments may be used. For example, the disclosed techniques are applicable to a wide variety of other types of data storage environments. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. An apparatus comprising:
at least one processor coupled to a memory and configured to:
obtain metadata from a file system in a data storage environment, wherein the obtained metadata from the file system is indicative of one or more properties of one or more data blocks storable in the data storage environment, wherein the metadata from the file system comprises a file type of a file with which the one or more data blocks are associated; and
control one or more data optimizations performed in a data protection operation for the data storage environment with respect to the one or more data blocks, wherein the data protection operation is configured to cause storage of at least one protected copy of the one or more data blocks, and wherein the controlling of the one or more data optimizations further comprises determining whether to perform or bypass performance of the one or more data optimizations on the one or more data blocks based at least on the file type of the file of the one or more data blocks being protected.

2. The apparatus of claim 1, wherein the metadata from the file system further comprises one or more of a file size, a file name, a file date, and a file location of a file with which the one or more data blocks are associated.

3. The apparatus of claim 1, wherein the data storage environment comprises a replication system comprising a production site and a replica site operatively coupled by a communications network.

4. The apparatus of claim 1, wherein the data storage environment comprises a data backup system.

5. The apparatus of claim 1, wherein the control of the one or more data optimizations further comprises deciding on placement of the one or more data blocks between a dedupeable data backup array engine and a non-dedupeable data backup array engine.

6. A method comprising:
obtaining metadata from a file system in a data storage environment, wherein the obtained metadata from the file system is indicative of one or more properties of one or more data blocks storable in the data storage environment, wherein the metadata from the file system comprises a file type of a file with which the one or more data blocks are associated; and
controlling one or more data optimizations performed in a data protection operation for the data storage environment with respect to the one or more data blocks, wherein the data protection operation is configured to cause storage of at least one protected copy of the one or more data blocks, and wherein the controlling of the one or more data optimizations further comprises determining whether to perform or bypass performance of the one or more data optimizations on the one or more data blocks based at least on the file type of the file of the one or more data blocks being protected;
wherein the obtaining and controlling steps are implemented by one or more processing devices each comprising a processor coupled to a memory.

7. The method of claim 6, wherein the metadata from the file system further comprises one or more of a file size, a file name, a file date, and a file location of a file with which the one or more data blocks are associated.

8. The method of claim 1, wherein the one or more data optimizations comprise one or more storage capacity optimization operations.

9. The method of claim 8, wherein the one or more storage capacity optimization operations comprise a data deduplication operation.

10. The method of claim 8, wherein the one or more storage capacity optimization operations comprise a data compression operation.

11. The method of claim 8, wherein the data storage environment comprises a replication system comprising a production site and a replica site operatively coupled by a communications network.

12. The method of claim 11, wherein the step of controlling the one or more storage capacity optimizations is performed at the production site.

13. The method of claim 6, wherein the data storage environment comprises a data backup system.

14. The method of claim 13, wherein the step of controlling the one or more data optimizations further comprises deciding on placement of the one or more data blocks between a dedupeable data backup array engine and a non-dedupeable data backup array engine of the data backup system.

15. The method of claim 1, wherein the step of controlling the one or more data optimizations further comprises estimating a probability that application of the one or more data optimizations will have a given effect on the data storage environment.

16. The method of claim 15, wherein the given effect is a savings of communications network bandwidth within the data storage environment.

17. The method of claim 15, wherein the given effect is an optimal placement of the one or more data blocks within the data storage environment.

18. A computer program product comprising a non-transitory processor-readable storage medium having stored therein program code of one or more software programs, wherein the program code when executed by at least one processing device causes said at least one processing device to:
obtain metadata from a file system in a data storage environment, wherein the obtained metadata from the file system is indicative of one or more properties of one or more data blocks storable in the data storage environment, wherein the metadata from the file system comprises a file type of a file with which the one or more data blocks are associated; and control one or more data optimizations performed in a data protection operation for the data storage environment with respect to the one or more data blocks, wherein the data protection operation is configured to cause storage of at least one protected copy of the one or more data blocks, and wherein the controlling of the one or more data optimizations further comprises determining whether to perform or bypass performance of the one or more data optimizations on the one or more data blocks based at least on the file type of the file of the one or more data blocks being protected.

19. The computer program product of claim 18, wherein the data storage environment comprises a replication system comprising a production site and a replica site operatively coupled by a communications network.

20. The computer program product of claim 18, wherein the control of the one or more data optimizations further comprises deciding on placement of the one or more data blocks between a dedupeable data backup array engine and a non-dedupeable data backup array engine.

\* \* \* \* \*